July 4, 1939.  E. HERING  2,165,052
FLEXIBLE PIPE JOINT
Filed Jan. 6, 1938
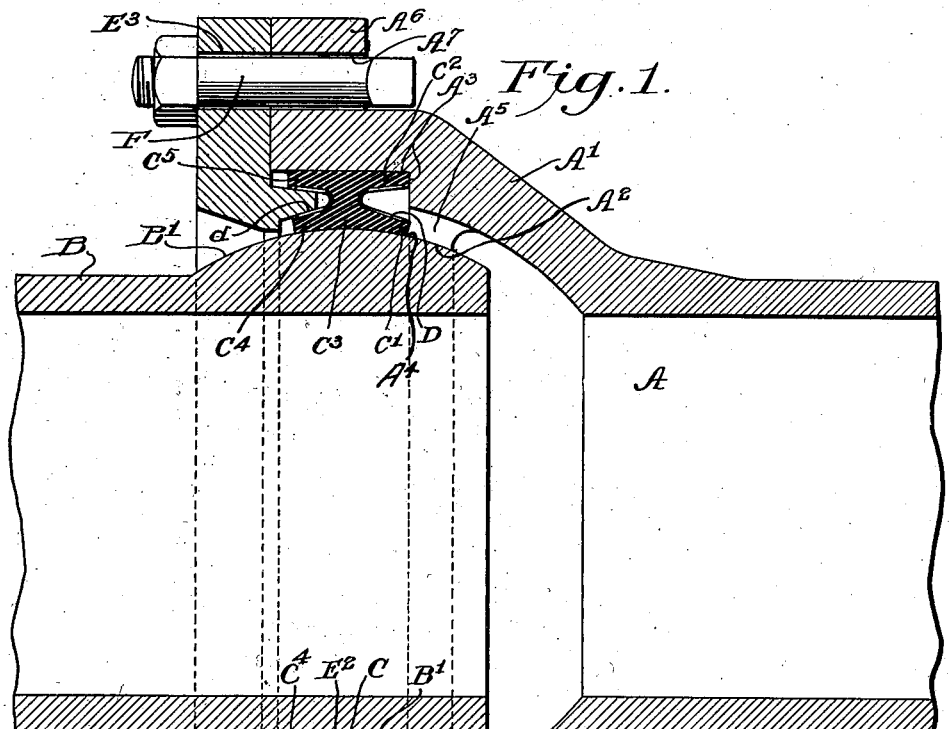
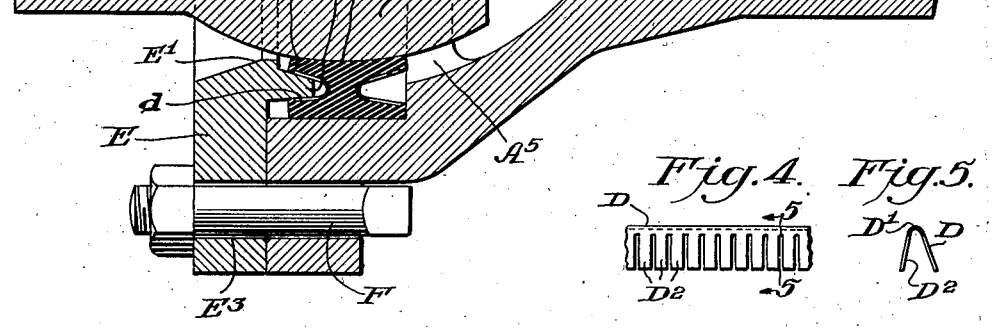
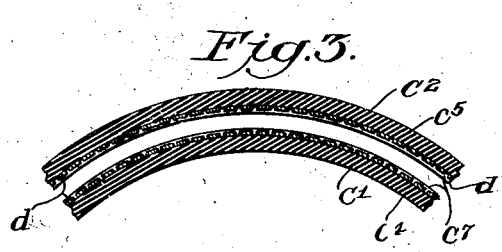
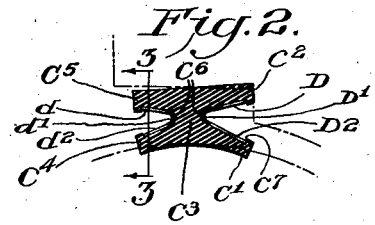
Inventor
Edward Hering
By [signature]
Attorney Patented July 4, 1939

2,165,052

UNITED STATES PATENT OFFICE 2,165,052

FLEXIBLE PIPE JOINT

Edward Hering, Beverly, N. J., assignor to United States Pipe and Foundry Company, Burlington, N. J., a corporation of New Jersey Application January 6, 1938, Serial No. 183,649

4 Claims. (Cl. 285—91)

My invention relates to flexible pipe joints of the ball and socket type. The object of my invention is to provide in the construction or make-up of such flexible joints for the utilization of such pressure as may exist in the fluid passing through the pipe to assist in tightening the joint against leakage and at the same time to provide for the positioning of the ball member of the joint in the bell member between a socket formed in the bell and contacting with the inner portion of the ball and a compressed resilient socket contacting with the outer portion of the ball.

By preference, my improved construction also provides for the formation of a tight joint of compressed resilient packing between the outer surface of the ball and the wall of a packing chamber formed in the bell member of the joint and of which packing the compressed resilient socket for the outer portion of the ball forms a part.

The construction of my improved pipe joint will be best understood as described in connection with the drawing forming a part of this specification and the novel features which I desire to claim as my invention will be carefully pointed out in the claims. Referring now to the drawing:

Figure 1 is a longitudinal section through my improved flexible pipe joint.

Figure 2 is a longitudinal section through the packing gasket used in the construction of the joint as shown in Fig. 1.

Figure 3 is a cross-section on the line 3—3 of Fig. 2, showing details of construction of the gasket packing.

Figure 4, a view of a section of the spring used in the construction of the packing gasket and Figure 5 is a cross-section on the line 5—5 of Fig. 4.

A is the end of one of the coupled pipes having formed on it the bell $A^1$ in which is formed a socket $A^2$ to receive the ball end of a coupled pipe and a packing chamber $A^3$ adapted to surround the ball of the coupled pipe and terminating in an annular shoulder $A^4$. The annular shoulder $A^4$ extends diametrically inwardly of the pipe to the surface of the socket $A^2$ and at this inner extremity has a diameter less than that of the ball of the pipe to be coupled thereto. $A^5$, $A^5$, are channels leading from the inner portion of the pipe A through the shoulder $A^4$. $A^6$ indicates a flange at the end of the bell having, as shown, bolt holes $A^7$ extending through it. B is the end of a pipe on which is formed a ball $B^1$ which, in the formation of the joint, rests at its outer end in contact with the socket $A^2$ and C is a packing gasket having, as shown, an approximation to an H shape. It is formed with two inner legs $C^1$ and $C^2$, the outer one, $C^2$, in the joint, resting on the shoulder $A^4$ and against the wall of the packing recess $A^3$, while the inner one, $C^1$, preferably somewhat curved to conform to the surface of the ball, rests in contact with the ball. These inner legs of the packing gasket are united, as indicated at $C^3$ and, as shown, the packing gasket is also formed with an outwardly extending leg $C^4$, resting in contact with the ball and, preferably, curved to fit against it. By preference, I also form the packing gasket with a second outwardly extending leg, indicated at $C^5$, adapted to rest against the wall $A^3$ of the packing chamber. By preference, the packing gasket which, it will be understood, should be of flexible material and preferentially of material also resilient, and resilience is especially important in the outer legs $C^4$ and $C^5$, and, preferentially, as shown in detail in Figs. 2, 3, 4 and 5, springs, as indicated at $D$, $d$, are located between the legs of the packing gasket tending, when the gasket is not forming a part of the joint, to give it the form indicated in Fig. 2, this being particularly of value as insuring that the legs $C^1$ and $C^2$ of the packing gasket will contact with the wall of the packing recess and with the face of the ball, even when no fluid pressure is acting to force these legs apart. The springs D and $d$ are of generally similar construction, each being formed of a plate folded on itself to form a head, as indicated at $D^1$ and $d^1$, from which head extend comb like tongues, as indicated at $D^2$ and $d^2$, and, by preference, the springs are secured in the packing gasket as shown, the heads $D^1$ and $d^1$ fitting in the slot like portions $C^6$, $C^6$, where the leg like portions of the gasket extend away from the cross-bar $C^3$ of the gasket and with the ends of the tongues $D^2$ and $d^2$ fitting against shoulders $C^7$, $C^7$, formed at the ends of the gasket legs. E indicates an annular gland, the inner edge of which, indicated at $E^1$, is formed so as to surround, without actually contacting with, the pipe B and ball $B^1$ when the joint is fully assembled, said gland being formed with a wedge like annular extension, indicated at $E^2$, which, when the gland is drawn to its final position, as indicated in Fig. 1, exerts a lateral thrust against the leg $C^4$, pressing it against the ball $B^1$, as shown, so as to form a compressed resilient seat for the ball and, where the gasket packing is formed with the leg C⁵; this wedge like extension also exerts a lateral thrust against the said leg, compressing it against the wall of the packing chamber. The gasket is drawn to operative position, as indicated, by means of bolts F extending through bolt holes E³ in the gland and through the bolt holes A⁷ in the flange A⁶ of the bell A¹.

In assembling the joint it is most convenient to place the gasket packing in position surrounding the ball and insert them together into the bell A¹ contacting the ball with the socket seat A² and, preferentially, contacting the end of the gasket leg C² with the wall A³, the annular gland E having been previously slipped over the ball so as to surround the pipe B, is then moved toward the bell so as to bring its wedge like extension E² into the space between the legs C⁴ and C⁵, and then the gland is drawn down against the flange A⁶ by means of the bolts F with the result that the wedge like extension of the gland exerts lateral pressure against the legs C⁴ and C⁵, compressing them respectively against the ball and against the wall of the packing chamber and forming a tight joint.

It will be seen that in the construction indicated that a pressure fluid contained in the coupled pipes has free access through the channels A⁵ to the space between the legs C¹ and C² and will exert pressure tending to move these legs outward, the one against the ball and the other against the wall A³ of the packing chamber, thus providing for a tight joint whenever pressure exists in the pipe line.

It is a feature of my construction that it does not rely for the tightness of the joint upon a ground fit between the ball B¹ and the socket A² or any other metal part and, therefore, does not require that the ball and socket should be carefully machined or ground, the compressed resilient socket formed by the leg C⁴ permitting sufficient longitudinal movement of the ball with regard to the socket to permit of the necessary flexibility of the joint while at the same time tending at all times to exert pressure against the ball to keep it in contact with the socket A².

Having now described my invention, what I claim as new and desire to secure by Letters Patent, is:

1. A flexible joint of the ball and socket type comprising a pipe bell having a socket for receiving the ball end of a pipe, an annular packing chamber in said bell for surrounding the ball when in place and terminating in an annular shoulder having a diameter less than that of the ball end; a packing member comprising two united, spaced, flexible, inwardly extending legs located in the packing chamber and engaging the shoulder at the end of the packing chamber, said packing member also having an outwardly extending flexible and resilient leg for contacting the outer portion of the ball, an annular gland member surrounding the ball but out of contact therewith, said gland having an annular wedge-like ribbed extension for contacting and compressing the outwardly extending leg of the packing member against the outer portion of the ball so as to form a resilient socket for said outer portion, and means for drawing the gland to and holding it in operative compressive relation to the outwardly extending leg of the packing member.

2. A flexible pipe joint as called for in claim 1, having one or more channels formed through the annular shoulder at the base of the packing chamber to permit inflow of fluid from the pipe in which the bell and socket is formed to the space between the two inner legs of the packing.

3. A flexible pipe joint as called for in claim 1, in which the packing member is formed with a second outwardly extending leg for contacting at its outer side the wall of the packing chamber and for contacting at its inner side with the wedge-like extension of the gland.

4. A flexible joint as called for in claim 1, including a spring member positioned between the inwardly extending leg members of the packing member for spreading the legs apart to insure contact of the legs with said ball and packing chamber wall.

EDWARD HERING.